United States Patent [19]
Parker

[11] Patent Number: 5,240,087
[45] Date of Patent: Aug. 31, 1993

[54] REAR SWING ARM SUSPENSION SYSTEM FOR A MOTORCYCLE

[76] Inventor: James G. Parker, 229 Anita Pl., Santa Fe, N. Mex. 87501

[21] Appl. No.: 773,885
[22] PCT Filed: Feb. 14, 1990
[86] PCT No.: PCT/US90/00857
§ 371 Date: Oct. 10, 1991
§ 102(e) Date: Oct. 10, 1991
[51] Int. Cl.$^5$ ............................................. B62M 9/16
[52] U.S. Cl. ................................ 180/231; 180/227; 280/285
[58] Field of Search ............... 180/231, 227, 219; 280/284, 285, 288

[56] References Cited

U.S. PATENT DOCUMENTS

| Re. 26,608 | 6/1969 | Hopkins | 180/219 |
|---|---|---|---|
| 4,742,884 | 5/1988 | Ishikawa | 180/227 |
| 4,794,998 | 1/1989 | Iwai et al. | 180/219 |
| 4,889,205 | 12/1989 | Yoshimi | 180/227 |
| 5,007,497 | 4/1991 | Trema | 180/227 |

FOREIGN PATENT DOCUMENTS

| 1122392 | 1/1962 | Austria. | |
|---|---|---|---|
| 333535 | 9/1989 | European Pat. Off. | 180/231 |
| 819509 | 10/1951 | Fed. Rep. of Germany. | |
| 293291 | 11/1989 | Japan | 180/227 |
| 28086 | 1/1990 | Japan. | |
| 1276557 | 12/1986 | U.S.S.R. | 180/227 |

*Primary Examiner*—Margaret A. Focarino
*Assistant Examiner*—Kevin Hurley
*Attorney, Agent, or Firm*—William A. Eklund

[57] ABSTRACT

The object of this invention is to provide a one-sided rear swing arm suspension system for a motorcycle having a chain-driven rear wheel, in which the tension of the drive chain may be adjusted without affecting the ride height of the motorcycle. The suspension system includes a rear swing arm (10) that is pivotably attached to the body (12) of the motorcycle, and which extends rearwardly around and alongside the rear wheel (16). The rear end of the swing arm includes elongate recesses which guide and receive an adjustment yoke (18). The rear wheel is journalled on a spindle (28) that extends transversely from the adjustment yoke. The yoke is positionable longitudinally on the swing arm by means of an adjustment stud (22) extending from the swing arm, and a corresponding adjustment nut (24) entrapped in the neck of the yoke. A single adjustment clamp nut (30) on the end of the spindle operates to secure the spindle to the yoke and to also secure the yoke to the swing arm at a selected position corresponding to a desired chain tension.

20 Claims, 6 Drawing Sheets

REAR SWING ARM SUSPENSION SYSTEM FOR A MOTORCYCLE

TECHNICAL FIELD

The invention described and claimed herein is generally related to motorcycle frame and suspension construction. More particularly, the present invention is related to swing-arm suspension systems for the rear wheel of a motorcycle.

BACKGROUND ART

For over thirty years motorcycles have typically included forked rear swing arm suspension systems. In such systems the rear wheel is journalled to the end of a forked swing arm. The forward end of the swing arm is hinged to the motorcycle body at a point forward of the wheel, and extends rearwardly therefrom. The swing arm is spring-loaded and damped, so as to absorb weight loads and road shocks by undergoing limited swinging motion in a vertical plane.

Some touring motorcycles have a pair of spring-loaded shock absorbers which extend upwardly from the ends of the forked swing arm. In such systems weight loads and road shocks are transmitted almost directly from the wheel axle to the shock absorbers. Most modern motorcycles, however, particularly including the off-road, or "motocross" motorcycles, have a single shock absorber and spring assembly, which is located forward of the wheel. In such systems weight loads and road shocks are transmitted through the swing arm to the shock absorber.

In recent years there has been introduced at least one class of one-sided rear swing arm assemblies. In these assemblies the rear wheel is journalled to an axle that extends horizontally in a cantilevered manner from the end of the swing arm, with the swing arm extending around and alongside one side of the wheel. Such an arrangement facilitates changing of the rear wheel, which can be removed horizontally from the free end of the axle, and also results in lighter overall weight, greater rigidity, and other advantages.

A problem associated with the previously known one-sided rear swing arm assemblies is that it has been difficult to provide a satisfactory mechanism for adjusting the tension in the drive chain. It will be recognized that in conventional forked swing arm assemblies this is not a problem, as the chain tension is readily adjusted by sliding the wheel forwardly or rearwardly in the slots which are ordinarily employed for engaging and supporting the axle of the wheel, and which are elongated for the purpose of allowing for adjustment of the chain tension. However, in the one-sided swing arm assemblies this approach has not been feasible.

Consequently, one approach has been to journal the rear wheel in an eccentrically mounted journal bearing, which can be selectively rotated to adjust the chain tension. Although this mechanism accomplishes the purpose of adjusting the chain tension, it also necessarily results in the rear wheel being raised or lowered with respect to the rest of the motorcycle, resulting in a small but definite change in ride height when the chain tension is adjusted.

The applicant has previously disclosed and claimed a one-sided front wheel suspension system in his U.S. Pat. No. 4,526,249, issued on Jul. 2, 1985, which is hereby incorporated by reference. As will be appreciated from the description below of the present invention, some of the same advantages that are obtained in the one-sided front wheel suspension system are also obtained in the rear wheel suspension system of the present invention. For example, in a one-sided suspension system weight loads and road shocks are transmitted to points on the motorcycle body which are both low, that is, close to the ground, and close to the center of gravity of the motorcycle, with consequent improvement in the handling, performance and ride of the motorcycle. Also, in a one-sided suspension system weight loads and road shocks are transmitted in a more direct path to the motorcycle body, thereby permitting a net reduction in the size and weight of the load-bearing structures that transmit these loads to the motorcycle body.

DISCLOSURE OF INVENTION

Accordingly, it is the object and purpose of the present invention to provide a one-sided rear swing arm suspension for a motorcycle having a chain-driven rear wheel.

More particularly, it is an object and purpose of the present invention to provide a one-sided rear swing arm suspension which enables the tension in the drive chain to be adjusted without resulting in vertical displacement of the rear wheel relative to the body of the motorcycle, and thereby without affecting the ride height of the motorcycle.

The foregoing objects and purposes are attained in the present invention, which provides a one-sided rear swing arm suspension system for a motorcycle having a body and a rear wheel which is driven by a drive chain. The suspension system includes a rear swing arm, an adjustable yoke and associated adjustment means, and a spindle. The rear wheel is journalled to the spindle. The spindle extends from the yoke transversely with respect to the swing arm. The yoke is adjustably secured to the swing arm by the adjustment means.

The swing arm includes first and second ends. The first end of the swing arm is pivotably attached to the body of the motorcycle at a position forward of the rear wheel, and ordinarily at a height corresponding generally to the axle height of the rear wheel. The swing arm extends rearwardly from the pivotably attached first end, around and alongside the rear wheel, to its second end. The second end of the swing arm includes longitudinal guide means for slidably receiving thereon the adjustable yoke. The yoke includes cooperable longitudinal guide means which engage the guide means on the second end of the swing arm. The guide means of the swing arm and the guide means of the yoke engage one another so as to allow selective longitudinal positioning of the yoke on the swing arm, while at the same time preventing relative rotational displacement of the yoke about the swing arm when the yoke is secured to the swing arm by the adjustment means.

The adjustable yoke preferably includes inner and outer side members which enclose the second end of the swing arm and which are slidably engaged by the guide means provided on the second end of the swing arm. The spindle extends from the yoke transversely with respect to the swing arm. The adjustment means enables selectively positioning the yoke longitudinally along the second end of the swing arm and also rigidly secures the yoke to the second end of the swing arm, preventing any longitudinal or rotational displacement of the yoke relative to the swing arm once the yoke is so secured. The adjustment means enables the distance of the yoke from the motorcycle body, and thus also the distance of the associated spindle from the body, to be selectively adjusted to thereby permit adjustment of the tension in the drive chain.

In a preferred embodiment the yoke includes coaxial transverse bores through both of its aforementioned side members; and the second end of the swing arm, on which the yoke is received, has an elongate longitudinal slot, through which the axes of the coaxial bores extend. The spindle passes through the bores of the yoke and also through the elongate slot in the swing arm. The spindle includes an integral shoulder which abuts the inside side member of the yoke, and is secured by means of an adjustment clamp nut on the opposite side. When the adjustment clamp nut is tightened, the spindle is firmly secured to the yoke, and the yoke is at the same time rigidly clamped about the second end of the swing arm, thereby securing the yoke and spindle at a desired distance from the motorcycle body.

The second end of the swing arm preferably includes a longitudinally extending adjustment stud, which extends rearwardly from the second end of the swing arm through a bore in the yoke. The yoke preferably also includes a rotatable, captured adjustment nut which engages the adjustment stud and which permits selective positioning of the yoke on the second end of the swing arm. With this arrangement the yoke is positioned with the adjustment nut, and subsequently secured to the swing arm with the adjustment clamp nut.

These and other aspects of the invention will be more fully apparent upon consideration of the following detailed description of a preferred embodiment, when taken with the accompanying drawings.

BRIEF DESCRIPTION OF DRAWINGS

The accompanying drawings constitute part of this specification and are hereby incorporated by reference. In the drawings.

BEST MODE FOR CARRYING OUT THE INVENTION

Figure 1:
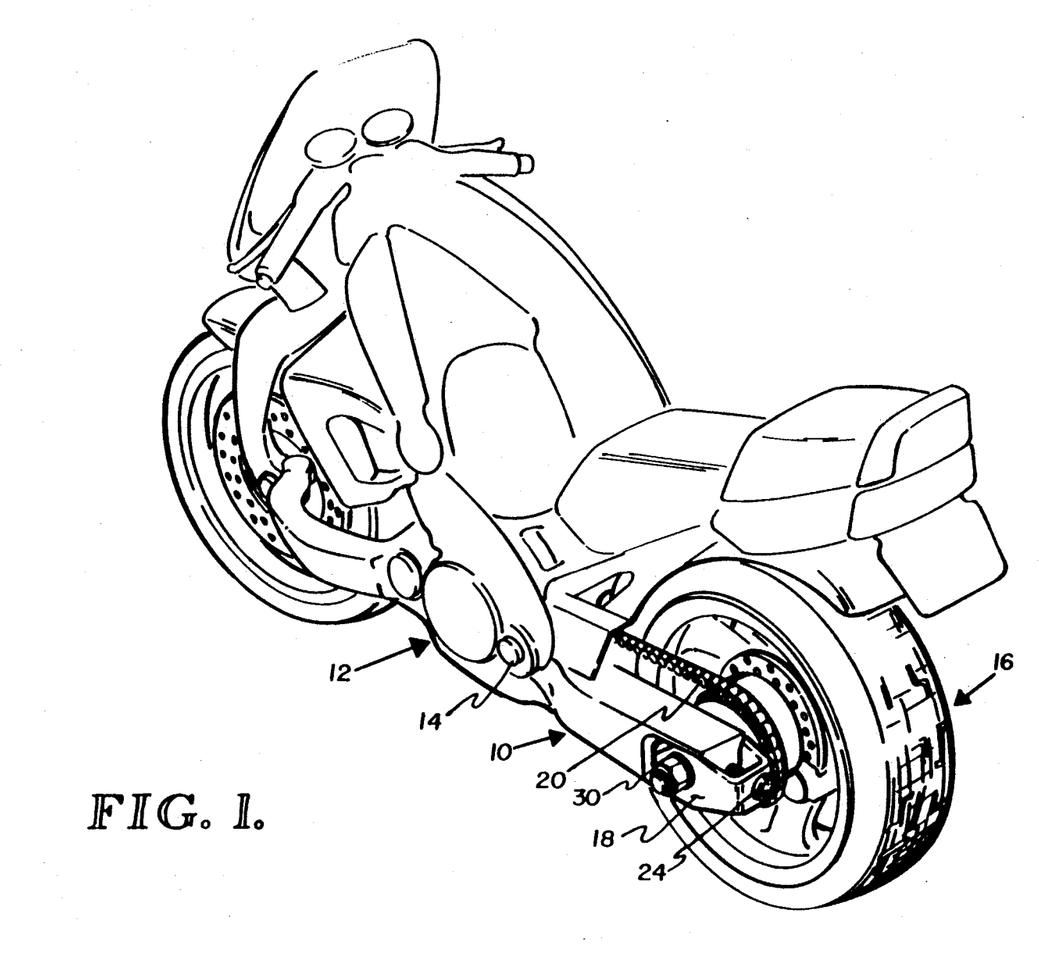
FIG. 1 is rear quarter view of a motorcycle equipped with the one-sided rear swing arm suspension system of the present invention.

Referring to FIGS. 1 through 7, and beginning particularly with FIG. 1, there is illustrated a motorcycle provided with a one-sided rear swing arm suspension system that constitutes a preferred embodiment and the best mode contemplated for carrying out the present invention. The suspension system generally includes a one-sided rear swing arm 10, which extends generally horizontally and rearwardly from the body 12 of the motorcycle. The forward, or first, end 10a of the swing arm 10 is pivotably attached to the motorcycle body 12 by means of an elongate bearing shaft 14. The swing arm 10 is pivotable about the bearing shaft 14 in a vertical plane. The swing arm 10 is spring-loaded so as to extend approximately horizontally from the body 12 of the motorcycle, and at a height corresponding approximately to the axle height of the rear wheel 16, under normal weight loads and operating conditions. The swing arm 10 is flared to a maximum width at its forward end 10a, so as to distribute twisting loads on the swing arm 10 over the full length of the bearing shaft 14, and to thereby provide maximum torsional rigidity to the swing arm 10. The flared forward end 10a of the swing arm 10 includes a large central hole 10b, through which a sprung and damped shock absorber assembly (not shown) ordinarily extends. The shock absorber assembly will normally be attached to a mounting boss (not shown) that extends from the underside of the swing arm 10 so as to be centered beneath the hole 10b. The shock absorber assembly forms no part of the present invention and consequently will not be described further.

It will be appreciated that in contemporary motorcycles there is an increasing tendency to integrate structural elements of the frame and the engine into an integrated unit that attains optimum structural, weight and performance characteristics. Consequently, for the purposes of this description, it should be understood that the body 12 may generally include a frame, or the engine of the motorcycle, or an integrated combination of the engine, frame and/or other major structural elements. In this regard the body 12 thus consists of the major structural components to which the swing arm 10 is attached.

From the flared forward end 10a, the swing arm 10 curves outwardly and extends along the left side of the rear wheel 16. The swing arm 10 is a rectangular tube along the majority of its length, and is welded to a solid spindle boss 10c which forms the second, or rear, end of the swing arm 10. In the preferred embodiment the spindle boss 10c thus constitutes the second end of the swing arm 10. The spindle boss 10c is adapted to slidably receive a cooperable adjustment yoke 18. Briefly, as described further below, the spindle boss 10c and the cooperable adjustment yoke 18 operate to enable the wheel 16 to be securely journalled to the end of the swing arm 10, while also enabling the tension in a main drive chain 20 to be adjusted to a desired level.

Figure 2:
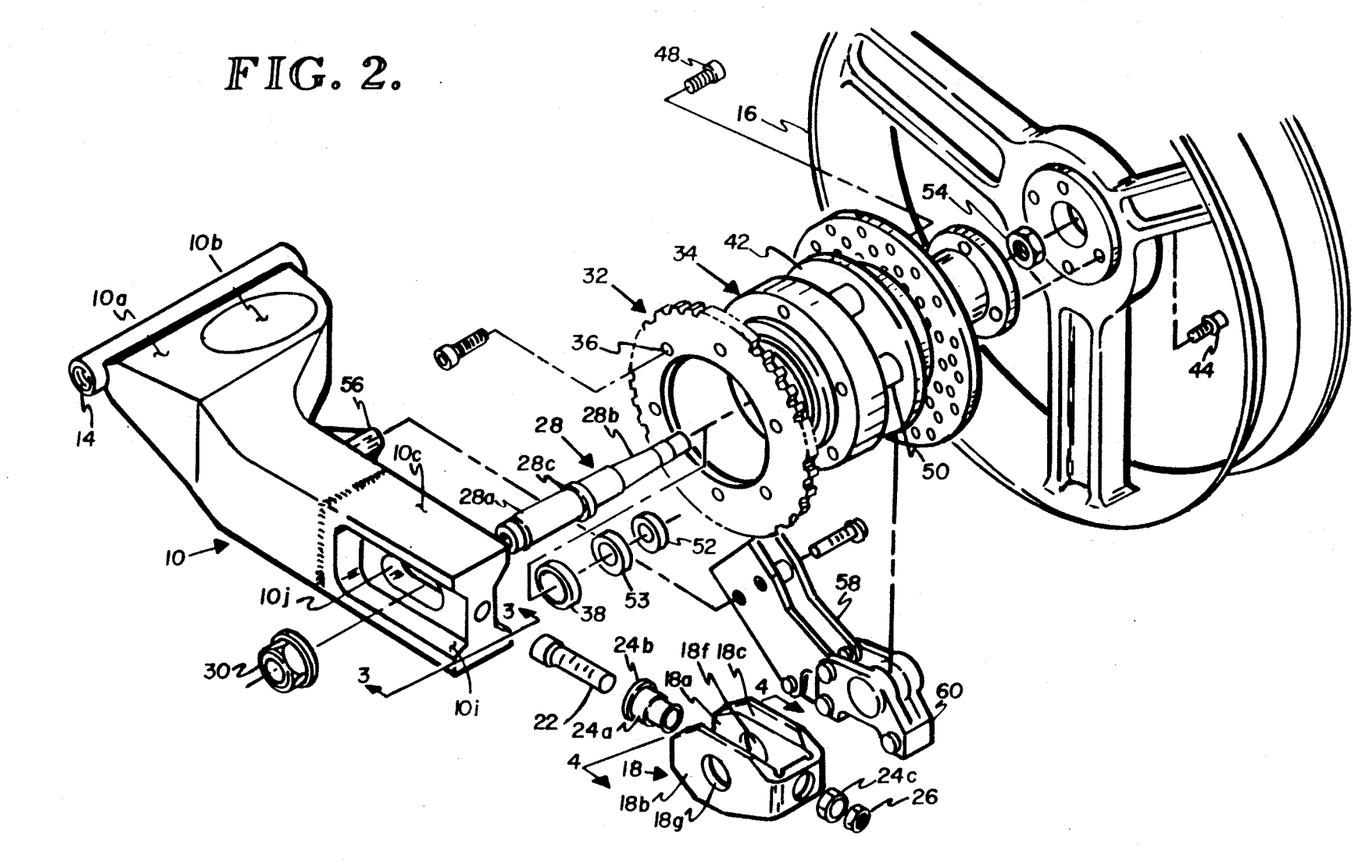
FIG. 2 is an exploded isometric view of the one-sided rear swing arm suspension system shown in FIG. 1.
Figure 3:
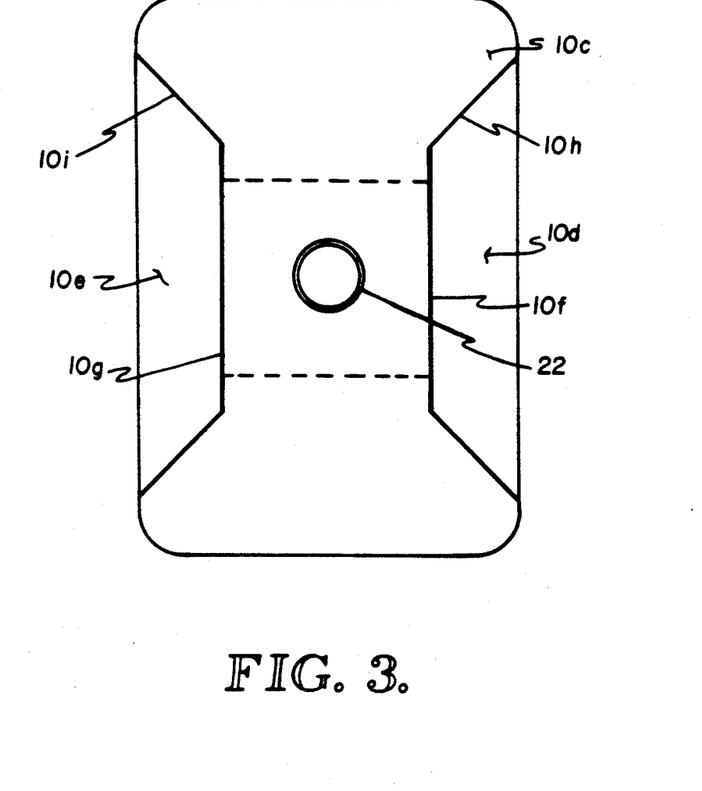
FIG. 3 is a rear end view, taken along line 3—3 of FIG. 2, of the swing arm of the suspension system illustrated in FIGS. 1 and 2; with the yoke, spindle and other elements of the suspension system removed.

Referring particularly to FIGS. 2 and 3, the spindle boss 10c on the rear end of the swing arm 10 is generally rectangular in cross section, and includes a pair of elongate, rearwardly opening inner and outer guide recesses 10d and 10e, respectively, which are formed in the opposite side walls of the boss 10c. The recesses 10d and 10e include floor surfaces 10f and 10g, respectively, which are parallel to one another and which are also generally vertical in orientation and parallel to the side walls of the swing arm 10. The recesses 10d and 10e further include side walls 10h and 10i, respectively, which extend at approximately 45 degree angles with respect to the floors 10f and 10g of the recesses 10d and 10e, as well as with respect to the sides of the spindle boss 10c and the swing arm 10 itself. The boss 10c further includes an elongate adjustment slot 10j which provides a transverse opening through the boss 10c. The adjustment slot 10j is generally centered in the recesses 10d and 10e and extends longitudinally, or parallel to the longitudinal axis of the swing arm 10. An adjustment stud 22 extends rearwardly from the rear end surface of the boss 10c.

Figure 4:
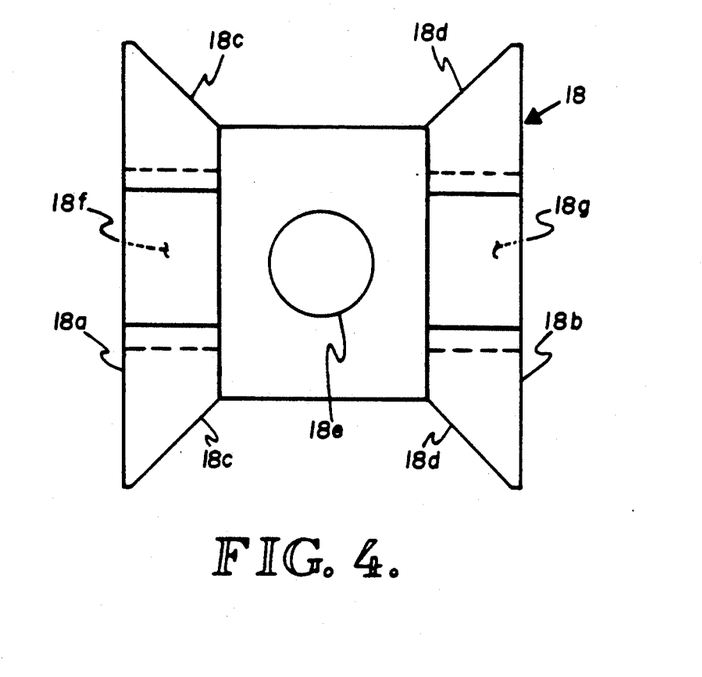
FIG. 4 is a front end view, taken along line 4—4 of FIG. 2, of the adjustable yoke of the suspension system shown in FIGS. 1 and 2, with its associated adjustment mechanism removed.

The adjustment yoke 18 is generally U-shaped and includes generally planar, integral inner and outer side members 18a and 18b, respectively. The integral side members 18a and 18b have inwardly facing edge surfaces 18c and 18d, respectively, which extend at an angle of approximately 45 degrees with respect to the planes of the side members 18a and 18b. When the yoke 18 is slid onto the swing arm boss 10c, the angled edge surfaces 18c and 18d slidably oppose the corresponding angled side walls 10h and 10i, respectively, of the spindle boss 10c. It will be seen further that the yoke 18 is sized so that the side members 18a and 18b are slidable longitudinally within the guide recesses 10d and 10e of the spindle boss 10c.

The neck of the yoke 18 includes a centered bore 18e (FIG. 4), in which there is located an entrapped position adjustment nut 24. The entrapped nut 24 includes a tubular sleeve 24a, which is threaded on its inside surface so as to engage the adjustment stud 22. An integral shoulder 24b on the inside end of the sleeve 24a, together with a peened or welded nut 24c on the outer end of the sleeve 24a, retain the sleeve 24a within the bore 18e. The nut 24 rotates freely in the bore 18e of the yoke 18, but is constrained against axial displacement within the bore 18e, thereby enabling the yoke 18 to be adjustably positioned on the spindle boss 10c by rotating the adjustment nut 24 while engaged with the adjustment stud 22 until a desired position of the yoke 18 is obtained with respect to the boss 10c. As will be seen below, this is how the chain tension in drive chain 20 is adjusted. A locking nut 26, also engaged on stud 22 outside the yoke 18, so as to abut the entrapped position adjustment nut 24, enables the yoke 18 to be locked into a desired position with respect to the spindle boss 10c.

The yoke 18 further includes an inner spindle bore 18f, which passes through inner side member 18a; and an outer spindle bore 18g, which passes through the outer side member 18b. The spindle bores 18f and 18g are coaxial, and are positioned so that they are centered on the adjustment slot 10j when the yoke 18 is slipped onto the swing arm boss 10c. As the yoke 18 is moved forwardly or rearwardly on the boss 10c, the spindle bores 18f and 18g move along the axis of the slot 10j while remaining centered on the slot 10j.

Figure 6:
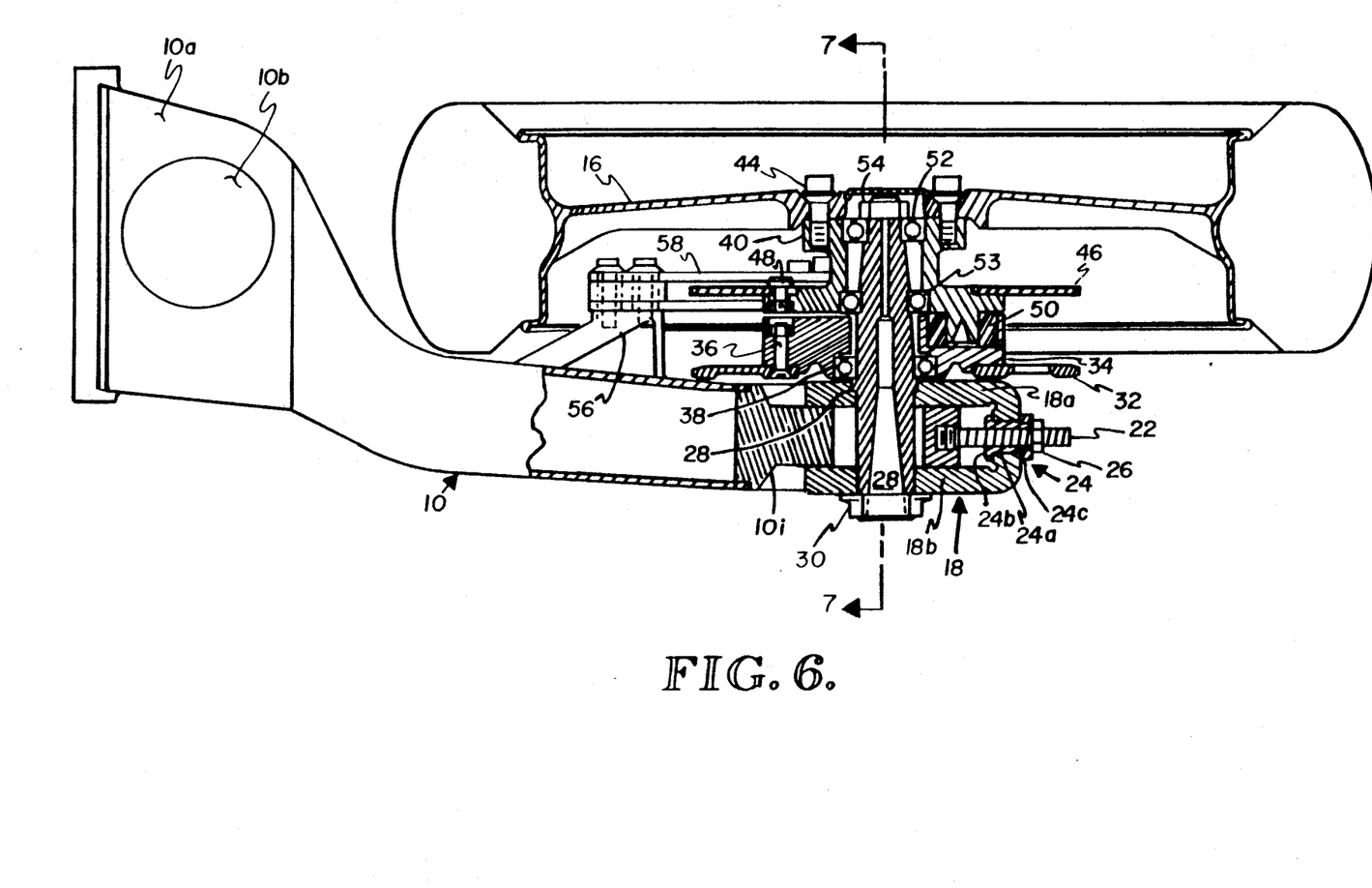
FIG. 6 is a plan view in cross section, taken along section line 6—6 of FIG. 7, of the assembled suspension system of FIGS. 1, 2 and 5.

The wheel 16 is journalled on a spindle 28, in a manner further described below. The spindle 28 generally includes a large-diameter outer end 28a, which passes through the yoke 18, and a generally tapered inner end 28b, on which the wheel 16 is journalled. The outer spindle end 28a passes through both bores 18f and 18g of the yoke 18, and also passes through the adjustment slot 10j of the spindle boss 10c. The outer end 28a of the spindle 28 is sized so as to be press fitted into the inner bore 18f (being so fitted while the yoke 18 is positioned on the spindle boss 10c, so that the inner end 28a of the spindle 28 passes through the adjustment slot 10j), and is slip fitted through bore 18g. An integral annular shoulder 28c on the spindle 28 abuts the inner side member 18a and thereby limits the penetration of the spindle 28 through the yoke 18. The portion of the outer spindle end 28a passing through and extending from the outer bore 18g is threaded, so as to be engageable with an adjustment clamp nut 30.

Figure 7:
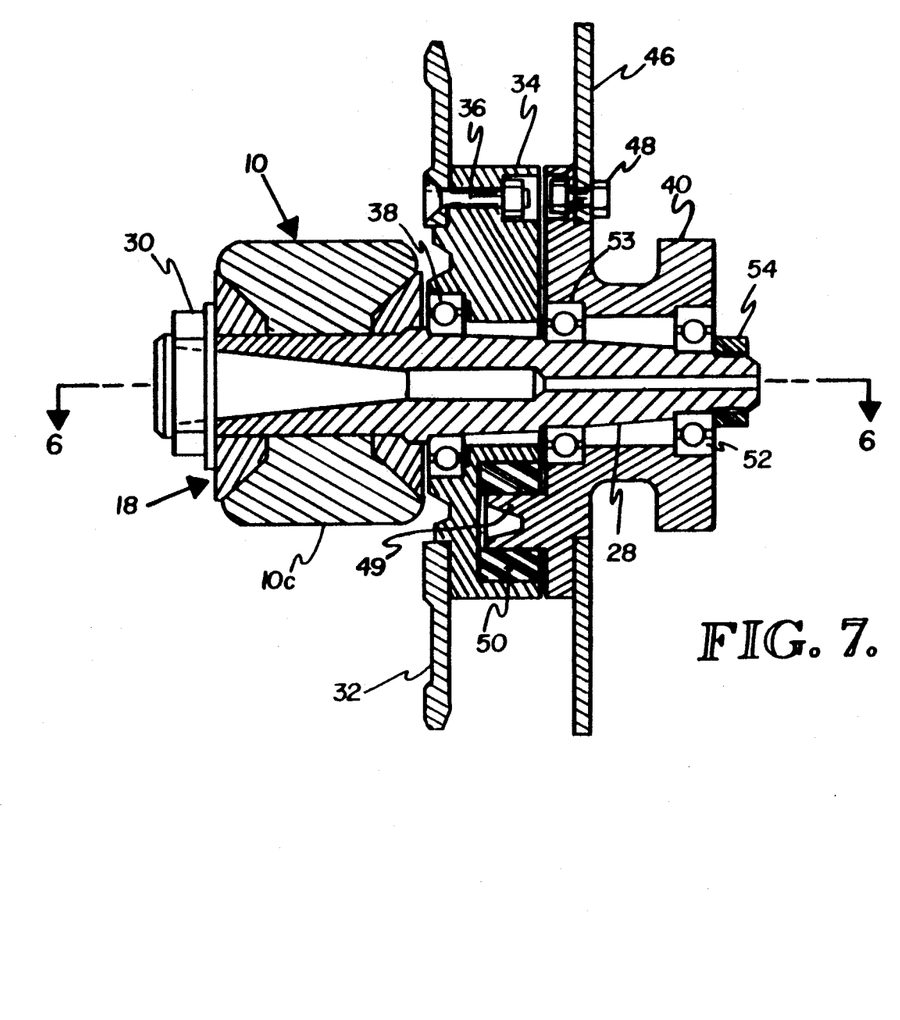
FIG. 7 is a rear end view in cross section, taken along section line 7—7 of FIG. 6, of the assembled suspension system of FIGS. 1, 2 and 5.

It will be noted that the 45 degree side walls 10h and 10i of the spindle boss 10c abut the corresponding 45 degree edge surfaces 18c and 18d of the yoke 18. When the adjustment clamp nut 30 is loosened, these surfaces slide past one another as the position of the yoke 18 on the swing arm boss 10c is adjusted. When the adjustment clamp nut 30 is tightened, these surfaces are driven against one another. This arrangement results in the spindle 28 being self-centered in the slot 10j, and also results in the spindle 28 being secured against both axial as well as radial displacements with respect to the end of the swing arm 10 and the boss 10c. This results in exceptionally secure and stable positioning of the spindle 28, while nevertheless allowing for longitudinal adjustment of the position of the spindle 28 along the swing arm boss 10c.

A chain sprocket 32 and an associated sprocket carrier 34 are journalled to the spindle 28 directly adjacent to and slightly spaced from the yoke 18. The sprocket 32 is bolted to the sprocket carrier 34 by means of bolts 36 and associated nuts. The sprocket carrier 34 is journalled to the spindle 28 by means of a bearing 38. The sprocket 32 is aligned with a transmission drive sprocket (not shown) which is located near the rear of the motorcycle body, and is connected to the transmission drive sprocket by the drive chain 20.

Adjacent to the sprocket carrier 34, and also journalled on the spindle 28, is a wheel carrier 40. The wheel carrier 40 supports several elements. First, the wheel 16 is bolted to the wheel carrier 40 by means of wheel bolts 42. Secondly, the wheel carrier 40 supports a brake disk 46, which is secured to the wheel carrier by bolts 48. The wheel carrier 40 also includes five integral, cylindrical drive elements 49, which extend into the sprocket carrier 34 and which engage cooperably positioned rubber drive cushions 50. The drive cushions 50 are annular in shape and are set into cooperably shaped circular recesses in the sprocket carrier 34. The drive cushions 50 operate to cushion the drive train link between the sprocket carrier 34 and the wheel carrier 40.

The wheel carrier 40 is journalled to the spindle 28 by means of a pair of outer and inner bearings 52 and 53, respectively. The wheel carrier 40 is secured to the spindle 28 by means of a spindle nut 54.

Figure 5:
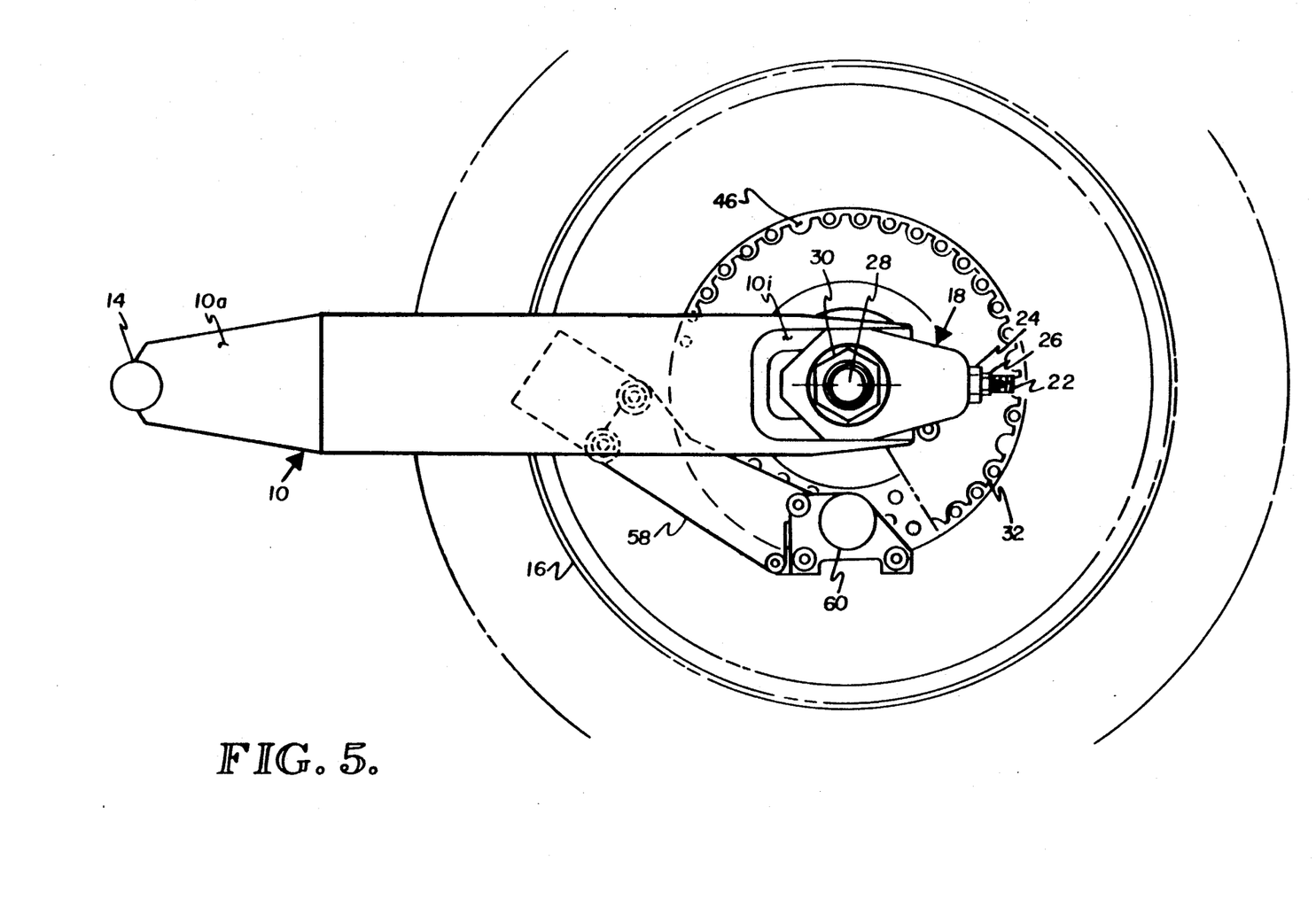
FIG. 5 is a side view of the assembled suspension system of FIGS. 1 and 2.

The swing arm 10 further includes an integral brake mounting boss 56, which extends inwardly from the inner side of the swing arm 10 at a position just inside the rim of the rear wheel 16. A caliper bracket 58 is attached to the brake mounting boss 56. The caliper bracket 58 extends downwardly and rearwardly from the boss 56, adjacent the wheel 16. A brake caliper 60 is affixed to the end of the bracket 58, and is positioned so as to straddle the outer periphery of the brake disk 46.

As noted above, the tension in the drive chain 20 is adjusted by sliding the yoke 18 forwardly or rearwardly on the swing arm boss 10c. In operation, the yoke 18 is first positioned longitudinally along the boss 10c by turning the adjustment position nut 24, with the clamp nut 30 being loosened just sufficiently to permit sliding displacement of the yoke 18 and spindle 28 with respect to the swing arm boss 10c. The adjustment nut 24 is turned with the clamp nut 30 loosened in this manner until a desired tension is attained in the drive chain 20. The adjustment clamp nut 30 is then tightened on the spindle 28, and the locking nut 26 is tightened on the stud 22. Tightening of the clamp nut 30 clamps the yoke side members 18a and 18b about the opposite sides of the swing arm boss 10c and thereby securely affixes the yoke 18 to the spindle boss 10c, at the position previously selected by means of the adjustment position nut 24. It will noted that adjustment of the chain tension in this manner has no effect on the vertical position of the spindle 28 with respect to the end of the swing arm 10, and thus has no effect on the ride height of the motorcycle.

The one-sided swing arm suspension system of the present invention may be sprung and damped by any one of a number of conventional shock absorber mechanisms of the general type previously used for forked swing arm suspensions. The preferred embodiment of the invention described above is adapted to receive a shock absorber that extends through the hole 10b in the swing arm 10. Such a shock absorber would be attached at its upper end to the body of the motorcycle, and would be attached at its lower end to a boss or bracket affixed to the swing arm 10 and positioned beneath the hole 10b. Other suitable shock absorption systems, which may be known in the art, may however also be employed.

Industrial Applicability

The present invention provides a one-sided rear wheel suspension in a motorcycle, wherein the drive chain tension may be adjusted without affecting the ride height of the motorcycle. This combination facilitates changing of the rear wheel while also ensuring a uniform ride height and uniform response to weight loads and road shocks regardless of adjustments made to the chain tension. Further, the spindle 28 is a non-rotating part, thus reducing slightly the rotating mass of the wheel assembly.

Although the present invention is described herein with reference to a preferred embodiment, it will be understood that various modifications, substitutions and alterations, which may be apparent to one of ordinary skill in the art, may be made without departing from the essential invention. Accordingly, the scope of the patent protection claimed herein is defined solely by the following claims.

The embodiments of the invention in which patent protection is claimed are as follows:

1. A one-sided rear swing arm suspension system for a motorcycle, said motorcycle having a body and a rear wheel, said rear wheel having a sprocket which is driven by a drive chain, comprising:
   a rear swing arm pivotably attached to said body of said motorcycle, said swing arm including longitudinal guide means for slidably receiving an adjustable yoke and a longitudinal adjustment slot passing transversely therethrough;
   an adjustable U-shaped yoke having guide means for slidably engaging said guide means of said swing arm;
   a non-rotating axle spindle on which said rear wheel and its associated sprocket are journalled, said spindle passing through said longitudinal adjustment slot and extending from said adjustable yoke transversely with respect to said swing arm; and
   adjustment means operable to adjustably secure said yoke to said swing arm at a selected longitudinal position along said swing arm by clamping said U-shape yoke along said axle spindle to said swing arm, whereby said wheel and said sprocket may be journalled to said spindle at a selected distance from said body of said motorcycle, and whereby the tension in said drive chain may be thereby adjusted without affecting the ride height of the motorcycle.

2. The one-sided rear swing arm suspension system defined in claim 1 wherein said swing arm has first and second ends, said first end of said swing arm being pivotably attached to said body of said motorcycle forward of said wheel, said swing arm extending from said first end around and alongside said rear wheel to said second end, said second end of said swing arm including longitudinal guide means for slidably receiving thereon said adjustable yoke, said yoke including inside and outside side members engageable with said guide means of said second end of said swing arm, said side members of said yoke including cooperable bores through which said spindle extends, and wherein said guide means of said swing arm and said side members of said yoke operate to prevent relative rotational displacement of said yoke and said spindle with respect to said swing arm when said yoke is secured to said swing arm.

3. A one-sided rear swing arm suspension system for a motorcycle having a body and a rear wheel driven by a drive chain, said suspension system comprising:
   a rear swing arm pivotably attached to said body of said motorcycle and extending rearwardly along one side of said rear wheel, said swing arm including a rear end having an inner side and an outer side, and said rear end of said swing arm further including a longitudinal adjustment slot passing transversely therethrough;
   a U-shaped yoke having inner and outer side members slidably engageable with said swing arm along said inner and outer sides respectively of said rear end of said swing arm;
   a non-rotating axle spindle on which said rear wheel is journalled, said axle spindle connecting said side members of said yoke and passing through said adjustment slot in said rear end of said swing arm and extending from said inner side member of said yoke transversely with respect to said swing arm, and means for compressing said side members of said yoke along said axle spindle so as to clamp said yoke to said inner and outer sides of said rear end of said swing arm; and
   chain adjustment means operable to adjustably position said yoke along said rear end of said swing arm at selected longitudinal positions, whereby the tension in said drive chain may be adjusted.

4. The one-sided rear swing arm suspension system defined in claim 3 wherein said inner and outer sides of said rear end of said swing arm include longitudinal guide means for slidably receiving thereon said inner and outer side members, respectively, of said yoke, whereby said yoke is slidably adjustable in longitudinal position on said rear end of said swing arm, and wherein said guide means of said swing arm operate to prevent relative rotational displacement of said yoke with respect to said swing arm when said yoke is secured to said swing arm.

5. The one-sided rear swing arm suspension system defined in claim 4 wherein a first end of said axle spindle is threaded and extends through bores in said inner and outer side members of said yoke, and wherein said spindle further includes an integral annular shoulder which abuts the outer side of said inner side member of said yoke, and wherein said means for compressing said side members of said yoke along said axle spindle comprises an adjustment clamp nut threaded to said first end of said axle spindle, whereby tightening of said adjustment clamp nut causes said side members of said yoke to clamp said rear end of said swing arm.

6. The one-sided rear swing arm suspension system defined in claim 5 wherein said chain adjustment means comprises an adjustment stud extending rearwardly from said rear end of said swing arm, and wherein said yoke includes a central bore having retained therein an entrapped rotatable adjustment position nut engageable on said adjustment stud, whereby the position of said yoke and spindle with respect to said swing arm and said motorcycle body are selectively adjustable by rotating said adjustment position nut.

7. The one-sided rear swing arm suspension system defined in claim 5 wherein said guide means on said rear end of said swing arm comprises a pair of inner and outer, rearwardly opening elongate recesses, said recesses having side walls which extend at an acute angle with respect to the axis of said spindle, and wherein said side members of said yoke have edge surfaces which extend at a corresponding acute angle with respect to the axis of said spindle, whereby tightening of said adjustment clamp nut causes said side walls and said edge surfaces to abut and thereby center and secure said spindle against axial as well as radial displacements.

8. The one-sided rear swing arm suspension system defined in claim 5 wherein said rear end of said swing arm includes a spindle boss affixed to said swing arm, and wherein said guide means on said rear end of said swing arm comprise a pair of inner and outer, rearwardly opening elongate recesses formed in said spindle boss, said recesses having side walls which extend at an acute angle with respect to the axis of said spindle, and wherein said side members of said yoke have edge surfaces which extend at a corresponding acute angle with respect to the axis of said spindle, whereby tightening of said adjustment clamp nut causes said side walls and said edge surfaces to abut and thereby center and secure said spindle against axial as well as radial displacements.

9. The one-sided rear swing arm suspension system defined in claim 8 wherein said acute angles of said side walls of said elongate recesses and said edge surfaces of said side members extend at approximately forty five degrees with respect to the axis of said axle spindle.

10. The one-sided rear swing arm suspension system defined in claim 3 further comprising a sprocket carrier and a wheel carrier each journalled to said spindle, said sprocket carrier being journalled to said spindle adjacent said yoke and supporting a chain sprocket, and said wheel carrier being journalled to said spindle adjacent said sprocket carrier and on the opposite side of said sprocket carrier from said yoke.

11. The one-sided rear swing arm suspension system defined in claim 10 wherein said sprocket carrier is engaged with said wheel carrier through a plurality of cushion elements contained in said sprocket carrier.

12. The one-sided rear swing arm suspension system defined in claim 11 wherein said wheel carrier supports a brake disk, and wherein said swing arm further comprises a brake mounting boss, and a brake caliper mounted to said mounting boss and positioned to engage said brake disk.

13. The one-sided rear swing arm suspension system defined in claim 3 wherein said swing arm is generally a rectangular tubular arm, and wherein said rear end of said swing arm comprises a spindle boss including longitudinal inner and outer guide means, said spindle boss further comprising an adjustment stud extending rearwardly therefrom, and where said yoke includes an entrapped position adjustment nut engageable with said stud, whereby said yoke may be selectively positioned longitudinally on said spindle boss.

14. The one-sided rear swing arm suspension system defined in claim 13 wherein said side members of said yoke include coaxial transverse bores through which said spindle extends, and wherein a first end of said spindle is press fitted through said bore of said inside side member of said yoke, and wherein said spindle is slip fitted through said bore of said outside side member of said yoke, said spindle including an integral shoulder which limits the penetration of said spindle through said bore of said inside side member, and wherein said spindle and said yoke are fixedly secured to said spindle boss by means of an adjustment clamp nut threaded to said first end of said spindle extending through said outer side member of said yoke, said adjustment clamp nut operating to clamp said side members of said yoke about said spindle boss while also centering and securing said spindle to said swing arm.

15. A one-sided rear swing arm suspension system for a motorcycle having a body and a rear wheel driven by a drive chain, said suspension system comprising:
a rear swing arm pivotably attached to said body of said motorcycle and extending rearwardly along one side of said rear wheel, said swing arm including a rear end having an inner side and an outer side, and said rear end of said swing arm further including a longitudinal adjustment slot passing transversely therethrough;
a U-shaped yoke having inner and outer side members slidably engageable with said swing arm along said inner and outer sides respectively of said rear end of said swing arm;
a non-rotating axle spindle on which said rear wheel is journalled, said axle spindle connecting said side members of said yoke and passing through said adjustment slot in said rear end of said swing arm and extending from said inner side member of said yoke transversely with respect to said swing arm; and
means for compressing said side members of said yoke along said axle spindle so as to clamp said yoke to said inner and outer sides of said rear end of said swing arm;
whereby said yoke and said axle spindle may be positioned and secured at selected positions along the rear end of the swing arm so as to enable selective adjustment of the tension in the drive chain.

16. The one-sided rear swing arm suspension system defined in claim 15 wherein said inner and outer sides of said rear end of said swing arm include longitudinal guide means for slidably receiving thereon said inner and outer side members, respectively, of said yoke, whereby said yoke is slidably adjustable in longitudinal position along said rear end of said swing arm, and wherein said guide means of said swing arm operates to prevent relative rotational displacement of said yoke with respect to said swing arm when said yoke is secured to said swing arm.

17. The one-sided rear swing arm suspension system defined in claim 15 further comprising chain adjustment means including an adjustment stud extending rearwardly from said rear end of said swing arm, and wherein said yoke includes a central bore having retained therein an entrapped rotatable adjustment position nut engageable on said adjustment stud, whereby the position of said yoke and spindle with respect to said swing arm and said motorcycle body are selectively adjustable by rotating said adjustment position nut.

18. The one-sided rear swing arm suspension system defined in claim 15 wherein said guide means on said rear end of said swing arm comprises a pair of inner and outer, rearwardly opening elongate recesses, said recesses having side walls which extend at an acute angle with respect to the axis of said spindle, and wherein said side members of said yoke have edge surfaces which extend at a corresponding acute angle with respect to the axis of said spindle, whereby compression of said side members of said yoke along said axle spindle causes said side walls and said edge surfaces to abut in wedging relationship so as to thereby center and secure said spindle with respect to said swing arm.

19. The one-sided rear swing arm suspension system defined in claim 15 wherein a first end of said axle spindle is threaded and extends through said inner and outer side members of said yoke, and wherein said axle spindle further includes an integral annular shoulder which abuts the outer side of said inner side member of said yoke, and wherein said means for compressing said side members of said yoke along said axle spindle comprises an adjustment clamp nut threaded to said first end of said spindle, whereby tightening of said adjustment clamp nut causes said side members of said yoke to clamp said rear end of said swing arm while also centering and securing said axle spindle with respect to said swing arm.

20. The one-sided rear swing arm suspension system defined in claim 15 further comprising a sprocket carrier and a wheel carrier each journalled to said spindle, said sprocket carrier being journalled to said spindle adjacent said yoke and supporting a chain sprocket, and said wheel carrier being journalled to said spindle adjacent said sprocket carrier and on the opposite side of said sprocket carrier from said yoke.

* * * * *